(12) United States Patent
Bueter (10) Patent No.: US 11,913,478 B2
(45) Date of Patent: Feb. 27, 2024

(54) PISTON UNIT OF A WORKING CYLINDER

(71) Applicant: BUEMACH ENGINEERING INTERNATIONAL B. V., TA Emmen (NL)

(72) Inventor: Josef Bueter, Haren/Altenberge (DE)

(73) Assignee: Buemach Engineering International B.V., TA Emmen (NL)

( * ) Notice: Subject to any disclaimer, the term of this patent is extended or adjusted under 35 U.S.C. 154(b) by 0 days.

(21) Appl. No.: 17/775,443

(22) PCT Filed: Nov. 6, 2020

(86) PCT No.: PCT/DE2020/000268
§ 371 (c)(1),
(2) Date: May 9, 2022

(87) PCT Pub. No.: WO2021/089070
PCT Pub. Date: May 14, 2021

(65) Prior Publication Data
US 2022/0397131 A1    Dec. 15, 2022

(30) Foreign Application Priority Data
Nov. 8, 2019 (DE) ..................... 20 2019 004 570.8

(51) Int. Cl.
| | |
|---|---|
| *F15B 15/14* | (2006.01) |
| *B23K 26/28* | (2014.01) |
| *B23K 26/242* | (2014.01) |
| *B23K 26/32* | (2014.01) |
| *B23K 26/282* | (2014.01) |
| *F16J 1/12* | (2006.01) |
| *B23K 101/00* | (2006.01) |

(52) U.S. Cl.
CPC ........ *F15B 15/1447* (2013.01); *B23K 26/242* (2015.10); *B23K 26/28* (2013.01); *B23K 26/282* (2015.10); *B23K 26/32* (2013.01); *B23K 2101/003* (2018.08); *F15B 2211/7054* (2013.01); *F16J 1/12* (2013.01)

(58) Field of Classification Search
CPC ......... F15B 15/1447; F15B 2211/7054; B23K 26/242; B23K 26/28; B23K 26/282; B23K 26/32
See application file for complete search history.

(56) References Cited

U.S. PATENT DOCUMENTS

| | | | | |
|---|---|---|---|---|
| 3,594,024 A * | 7/1971 | Hertell | ........................ | F16J 1/12 |
| | | | | 403/345 |
| 3,655,017 A * | 4/1972 | Lorcher | .................... | B23K 1/20 |
| | | | | 285/289.1 |
| 9,995,323 B2 * | 6/2018 | Jene | .................... | F15B 15/1447 |

FOREIGN PATENT DOCUMENTS

| | | | | |
|---|---|---|---|---|
| DE | 10334205 A1 | 2/2005 | | |
| DE | 102013008408 A1 | 11/2014 | | |
| DE | WO 2016/058619 | * 4/2016 | .......... | F15B 15/1447 |

(Continued)

*Primary Examiner* — Dustin T Nguyen
(74) *Attorney, Agent, or Firm* — Laurence A. Greenberg; Werner H. Stemer; Ralph E. Locher (57) ABSTRACT

A piston unit of a working cylinder includes a piston and a piston rod. The piston has an axial bore hole formed therein. The piston rod is received in the axial bore hole. The piston rod and the piston are connected by a material-bond by a circumferential laser ring weld seam. The laser ring weld seam defines a pressure medium-tight sealing plane.

1 Claim, 8 Drawing Sheets

(56) References Cited

FOREIGN PATENT DOCUMENTS

| EP | 1503114 A1 | 2/2005 |
| WO | 2014183835 A1 | 11/2014 |
| WO | 2016058619 A1 | 4/2016 |

* cited by examiner

PISTON UNIT OF A WORKING CYLINDER

FIELD AND BACKGROUND OF THE INVENTION

The invention relates to a piston unit of a working cylinder formed from a piston and a piston rod.

Various solutions to couple a piston to a piston rod are known from the state of the art. Both positive-locking, force-locking and material-bonding couplings are known.

Positive-locking and force-locking couplings generally have the problem that additional measures are required to prevent the coupling of piston and piston rod from loosening. Moreover, positive-locking couplings normally have the disadvantage that due to machine-molded sections, such as grooves or threads that are produced in the piston rod, the piston rod must be fully formed or at least with great wall thicknesses in order to obtain sufficient stability. In addition, notch effects can be disadvantageous. Furthermore, the usual machining of the piston rod and piston are comparatively material- and cost-intensive. Moreover, it is difficult to provide backlash-free positive-locking couplings.

Further, it is principally known to connect the piston and the piston rod to each other by means of material bonding. Loosening can be prevented by this method but it has other disadvantages. As far as this coupling is done by gluing, there is the disadvantage of comparatively low strength and low security against failure of the connection. Therefore, gluing is only possible in specific applications.

In particular, welded joints are known in principle but these require the employment of highly qualified personnel and are difficult to manufacture. In particular, there is the disadvantage of thermal stress on the coupling partners which can cause changes in the material structure, particularly of the piston rod, and thus require too thick-walled piston rods or piston rods made of solid material.

SUMMARY OF THE INVENTION

The task of the invention is to provide a piston unit of a working cylinder that is formed by coupling a piston and a piston rod and can be manufactured at low cost and ensures an exceptionally high level of operational safety.

The task is solved by the features specified in claim 1 the independent claim.

Preferred further embodiments result from the sub-claims.

According to the invention, the piston unit of a working cylinder comprises a piston and a piston rod. In a particularly preferred embodiment, the piston and piston rod are made of a steel material.

The piston unit according to the invention can be in particular a piston unit of a differential cylinder, a synchronized cylinder, or also of other types of working cylinders, such as for example a pneumatic cylinder or traction cylinder. Piston units, in particular of accumulator cylinders, hydraulic shock absorbers or gas spring cylinders, are likewise included, if they comprise a piston coupled to a piston rod.

According to the invention, the piston has an axial bore hole in which the piston rod is received.

The axial bore hole in the piston is designed in such a way that the piston rod can be received in it. The axial bore hole has preferably a round cross-section.

According to the invention, the piston rod and the piston are connected in a material-bonding (integrally connected) manner by means of a circumferential laser ring weld seam.

Thus, the laser ring weld seam is arranged on the opposing contact surfaces of the piston and piston rod, wherein an outer cylindrical lateral surface of the piston rod and an inner cylindrical lateral surface of the piston generally face each other. However, other designs of contact surfaces are also possible.

The laser ring weld seam is particularly characterized in that laser welding advantageously produces an extremely narrow, tapered and substantially V-shaped weld seam. The lateral flanks of the laser weld seam form an acute weld seam angle of preferably less than 15 degrees and, in a particularly preferred design, less than 10 degrees.

The laser ring weld seams forms a pressure-tight sealing plane according to the invention.

The laser ring weld seam extends continuously along the contact surface between the piston and piston rod. It thus forms a tight material-bonding connection which prevents the passage of the pressure medium without the need for additional means, such as seals for example.

With the piston unit according to the invention, a solution has been found which, in particular, has the following significant advantages over the state of the art.

A first advantage of the piston unit produced in this way is its high precision and concentricity. Since only a small amount of energy per length of the weld seam needs to be supplied for welding (low energy input per unit length), substantially lower thermal stresses are caused which could lead to a distortion of the piston rod.

A further advantage is that material removal by machining which weakens the cross section is not required, especially not for the piston rod. This advantage increases the mechanical load capacity and, at the same time, reduces material consumption.

Furthermore, apart from cutting the piston rod to length, machining of the piston rod is hardly required. This advantageously reduces the expenditure on machining technology, tool costs, time and energy.

A particularly important advantage is the high strength. The laser ring weld seam has a small width but nevertheless a great weld seam depth. Due to the great weld seam depth, a large area is welded so that particularly high forces can be transmitted at the laser ring weld seam with the same mechanical stress or, conversely, that lower mechanical stresses occur at the laser ring weld seam with the same forces.

Advantageously, this also achieves a particularly high level of operational safety because the low mechanical tension means that there is a particularly high reserve capacity before an overload occurs. In particular, the coupling is reliable and stable over the long term when faced with dynamic loads with frequent load changes that normally occur in hydraulic working cylinders.

In addition to the comparatively great weld seam depth, the width of the weld seam is advantageously small. Due to the small weld seam width, the material of the coupling partners is only thermally stressed close to the surface, which is particularly advantageous for the piston rod because in this way it is hardly weakened or thermally distorted.

Overall, the laser ring weld also has a low volume so that the total heat input is low. The lower heat input means that there is no scaling of the material, which would otherwise have to be removed again in a further work step.

In particular, due to the surprisingly achievable combination of the described advantages, the piston rod can be designed in a particularly material-saving manner and thus raw material resources can be preserved.

Moreover, it is advantageous that no additional means of sealing have to be provided between the piston rod and piston. In contrast to sealing rings, the pressure-tight sealing plane produced by the laser ring weld seam between the piston rod and piston is not subject to wear.

With respect to production technology, there is also the advantage of a high speed of laser welding and, due to the low energy input, the particularly short time required for cooling before further processing can be started.

Another production advantage is that thermally sensitive components, such as guides or elastomer seals, can already be mounted on the piston before laser-welding the piston to the piston rod.

According to an advantageous further development, the laser ring weld seam is arranged on a bottom side on the front face and with a weld center axis running parallel to a main longitudinal axis of the piston rod.

The weld seam center axes are arranged parallel to the main longitudinal axis of the piston rod and along the contact surfaces between the piston and piston rod.

In this further development, the weld seam center axis corresponds to the course of the contact surfaces of the coupling partners.

If the laser runs exactly along the contact surface, the piston and piston rod are subject to substantially the same thermal load and, with the same material quality, are also melted in a symmetrical weld seam along the weld seam center axis.

Thus, in this further development, a particularly large-area connection of the contact surfaces is advantageously achieved with a simultaneous low thermal load on the coupling partners.

In particular, this further development is advantageously feasible if there is sufficient freedom of movement for the laser along the central axis of the weld seam and over the contact surfaces to be connected, as this particularly applies to the bottom sides of the piston.

According to a further advantageous further development, the laser ring weld seam is arranged on the piston rod side piston-rod sided, and the weld seam center axis is arranged inclined to the main longitudinal axis at an inclination angle alpha ranging from 2 to 15 degrees.

To be able to weld the piston rod side, the laser must be placed in an inclined position to it. The center axis of the weld seam, which also corresponds to the incoming path of the laser, and the main longitudinal axis include an inclination angle alpha.

In this further development, the inclination angle alpha is between 2 and 15 degrees, preferably 4 to 8 degrees and in a particularly preferred design 5 degrees.

In order to achieve a stronger connection between the piston and the piston rod, it is aimed to obtain a melting area as large as possible along the contact surface between the two coupling partners. It has been found that due to the conical cross-section of the laser ring weld seam, sufficient melting is achieved when its edge area runs along the contact surfaces. Thus, the inclination angle is preferably not greater than half the weld seam angle of the laser ring weld seam.

The advantage of this further development is that even with less freedom of movement of the laser, which is in particular along the piston rod, a laser ring weld seam with a great effective weld seam depth can be provided.

According to an advantageous further development, the piston unit has a first and a second laser ring weld seam.

According to this advantageous further development, the first laser ring weld seam is arranged on the bottom side front-face-sided and its weld seam center axis is running parallel to a main longitudinal axis of the piston rod, and the second laser ring weld seam is arranged on the piston rod side piston-rod-sided and its weld seam center axis inclined at an inclination angle alpha of 2 to 15 degrees relative to the main longitudinal axis. The inclination angle alpha of the second laser ring weld seam ranges preferably from 4 to 8 degrees and in a particularly preferred design it is 5 degrees.

In this further development, both previously described advantageous further embodiments are combined.

In an advantageous embodiment, the weld seam depths of the first and second laser ring weld seams extend on the whole over the entire contact surface between the piston and piston rod so that the material-bonding connection between the piston and piston rod utilizes the entire contact surface. Thus, the maximum load capacity of the coupling is achieved.

It is also possible that both laser ring weld seams connect the piston and piston rod only partially along the contact surface. The axial force transmission via the two ring surfaces of the two laser ring weld seams formed in this way complement one another and also provide a particularly high load capacity of the coupling. The heat input is lower than with a continuously welded contact surface.

According to yet a further advantageous development, the piston unit is designed as a piston unit of a synchronized cylinder.

The piston unit of a synchronized cylinder is designed such that the piston is fixed centrally on the piston rod. The piston rod is guided completely through the piston and axially projects it on both sides.

According to this advantageous further development, the piston has a first and a second piston rod side. Due to the specific design of the synchronized cylinder, the piston has no bottom side but instead two piston rod sides.

According to the advantageous further development, the piston unit comprises a first and a second laser ring weld seam, and the laser ring weld seams are arranged opposite each other.

The piston is attached to the piston rod by means of two circumferential laser ring weld seams.

According to this advantageous further development, the first and second laser ring weld seam each is arranged on one piston rod side and their weld seam center axes are inclined at an angle alpha of 2 to 15 degrees relative to the main longitudinal axis.

Since the piston rod runs through the piston, both laser ring weld seams are produced with a weld center axis bevelled by the angle alpha. The angle alpha is between 2 and 15 degrees, preferably 4 to 8 degrees and in a particularly preferred design 5 degrees.

Thus, the optimum connection between piston and piston rod is advantageously established for this piston design.

According to a further advantageous embodiment, the piston rod has a chromium-plated outer lateral surface.

Because of the special loads, piston rods are often designed with a chromium-plated outer lateral surface. In this case, the piston rods are purchased as chromium-plated rod material, cut to length and then further processed with an already chromium-plated surface.

Here, the manufacturing problem is that, practically, the chromium-plated outer lateral surface does not allow welding according to the state of the art.

It was found that by means of the thermal effect of the laser ring weld seam on the chromium-plated outer lateral surface, a structural change in the chromium layer is caused so that it changes is structure between the steel of the piston and the piston rod in such a manner that a high adhesive friction is achieved on the opposite contact surfaces, i.e., between the outer cylindrical lateral surface of the piston rod and the inner cylindrical lateral surface of the piston. This provides a sufficiently high axial force transmission between the piston and piston rod.

The particular advantage of this further development is that an otherwise necessary removal of the chromium-plated outer lateral surface can be omitted.

According to another advantageous further development, the chromium-plated outer lateral surface has a non-chromium-plated annular section with a reduced cross-section.

For this purpose, the chromium layer is removed in the annular section by means of a machining process, preferably grinding or turning. There is a piston-rod surrounding annular section the cross-section of which is reduced at least by the thickness of the removed chromium layer.

According to this advantageous further development, an annular compensation layer is provided between the piston and the annular section with a reduced cross-section. The compensation layer compensates for the difference in diameter between the non-chromium-plated annular section with a reduced cross-section and the rest of the piston rod, and can also exceed the difference if necessary. For this purpose, the annular compensation layer, which preferably consists of at least one molded body, can be inserted into the cross-section-reduced annular section and the piston can be pushed over it. It is also possible to insert the annular compensation layer as a cutting ring.

In this advantageous further development, the piston rod is connected to the annular compensation layer by a radial inner laser ring weld seam and the annular compensation layer is connected to the piston by a radial outer laser ring weld seam. For this purpose, the material of the annular compensation layer is adjusted to the material of the piston as well as to the material under the chromium-plated outer lateral surface of the piston rod in such a manner that fusion can take place.

In this way, components of a piston unit which have an additional surface treatment, such as chromium plating, can also be advantageously welded.

According to an advantageous further development, the piston is surface-hardened. The surface of the piston is hardened by means of a method known from the prior art, such as nitriding. Such a change in the material properties on the surface complicates or excludes a welded joint according to the state of the art.

According to an advantageous further development, the piston rod has an axial contact surface on the front face. Preferably, this is a plane surface arranged orthogonally to the main longitudinal axis of the piston rod.

This is a non-hardened contact surface. A centring pin is preferably arranged in the center of the contact surface.

According to the advantageous further development, the piston has a flat cylindrical machine-molded section on the piston rod side, and the front face of said section forms a piston-rod-sided axial mating contact surface.

The mating contact surface is also preferably aligned orthogonally to the main longitudinal axis and is designed as a plane surface.

In the middle of the flat cylindrical machine-molded section, a centring bore hole is preferably provided, in which the centring pin of the piston rod engages and thus fixes the piston and piston rod radially to each other when coupled.

The contact surface and mating contact surface are in contact over their whole surfaces during coupling.

According to this advantageous further development, the mating contact surface features a surface removal, wherein a hardened surface has been removed by this surface removal.

In the area of the mating contact surface, the hardened surface is preferably removed by surface grinding until the base material is reached.

According to this advantageous further development, the laser ring weld seam is arranged transversely to the main longitudinal axis and connects the contact surface and the mating contact surface in a material-bonding manner.

This further development is particularly advantageous for piston units of microcylinders. Here, microcylinders are understood to be, in particular, working cylinders with a piston diameter of up to 50 mm. This further development has the advantage of a high manufacturing efficiency and simultaneously provides a sufficient load capacity of the piston.

The invention is described as an exemplary embodiment in more detail by means of the following figures. They show.

BRIEF DESCRIPTION OF THE FIGURES

DETAILED DESCRIPTION OF THE INVENTION

Figure 1:
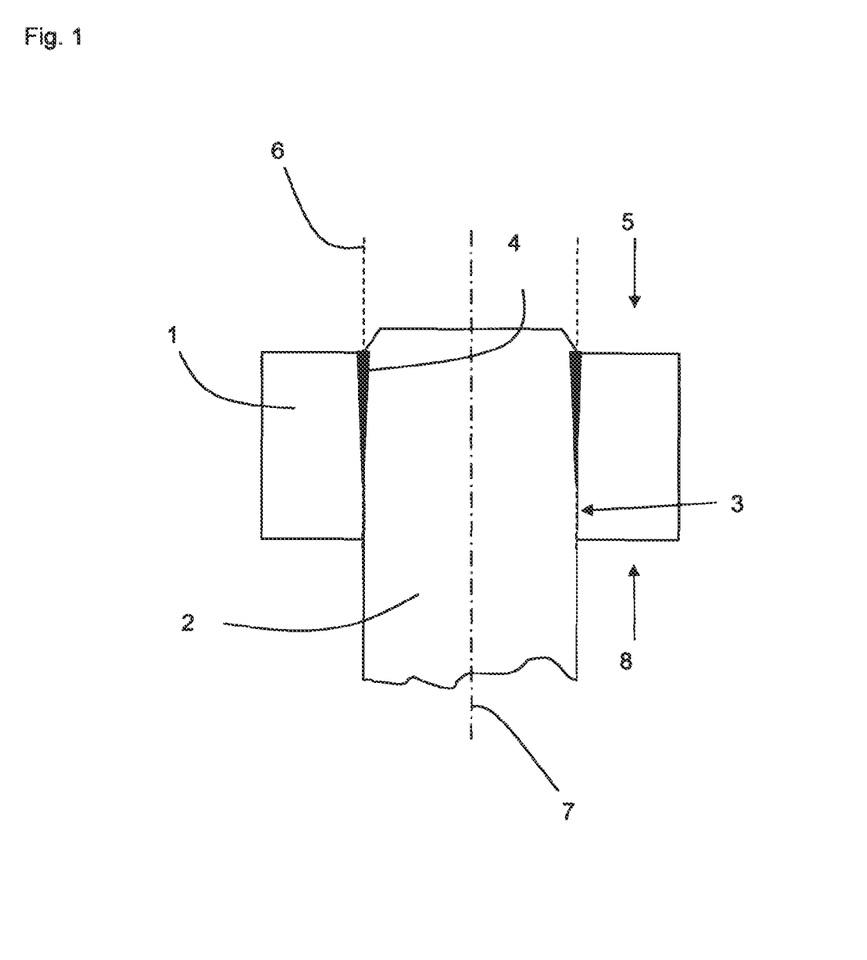
FIG. 1 Piston unit of a working cylinder (welded on the bottom side)
FIG. 2 Piston unit of a working cylinder (welded on the piston rod side)
FIG. 3 Piston unit of a working cylinder (closed piston)
FIG. 4 Piston unit of a working cylinder (welded on both sides)
FIG. 5 Piston unit of a synchronized cylinder (welded on both sides)
FIG. 6 Piston unit of a working cylinder (with annular compensation layer)
FIG. 7 Piston unit with hardened piston surface (exploded view)
FIG. 8 Piston unit with hardened piston surface (welded).

FIG. 1 shows a first embodiment of a piston unit of a working cylinder in a schematic sectional view. The piston unit comprises a piston 1 and a piston rod 2. The piston 1 has an axial bore hole 3 in which the piston rod 2 is received. It has a bottom side 5 and a piston rod side 8.

The piston unit has a laser ring weld seam 4 which connects the piston 1 and the piston rod 2 in a material-bonding manner. The laser weld seam 4 is arranged on the bottom side 5.

The laser ring weld seam 4 has a weld seam center axis 6 which runs centrally through the cross-section of the laser ring weld seam 4.

This weld seam center axis 6 runs parallel to the main center axis 7 of the piston rod 2 and along the corresponding contact surfaces of the piston 1 and piston rod 2.

In this embodiment, welding is performed from the bottom side 5 by means of a laser welding process. Laser welding processes, in which the weld seam center axis 6 runs parallel to the main longitudinal axis 7, are possible on the bottom side due to the required freedom of movement of the laser emitter.

Figure 2:
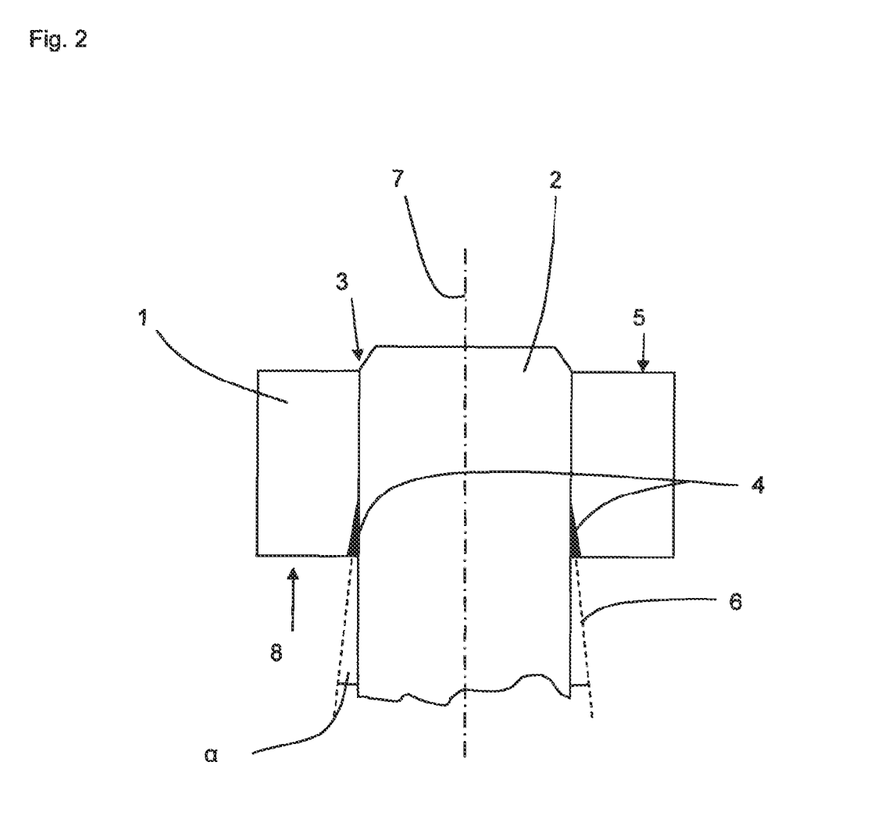

FIG. 2 shows another embodiment of a piston unit which is welded on the piston rod side. Here, the laser ring weld seam 4 is inclined at an inclination angle α of 5 degrees. In all other respects, the piston unit illustrated in FIG. 2 is identical in construction to the piston unit shown in FIG. 1.

Due to the piston rod 2, the laser is inclined at the inclination angle α relative to the main longitudinal axis 7 of the piston rod 2. Thus, the weld seam center axis 6, which corresponds to the course of the laser beam, is not parallel to the main center axis 7 as in FIG. 1 and includes the inclination angle α with it.

In this embodiment, the edge area of the laser ring weld seam 4 overlaps with the contact surfaces between the piston 1 and piston rod 2, thus producing the joint between them.

Figure 3:
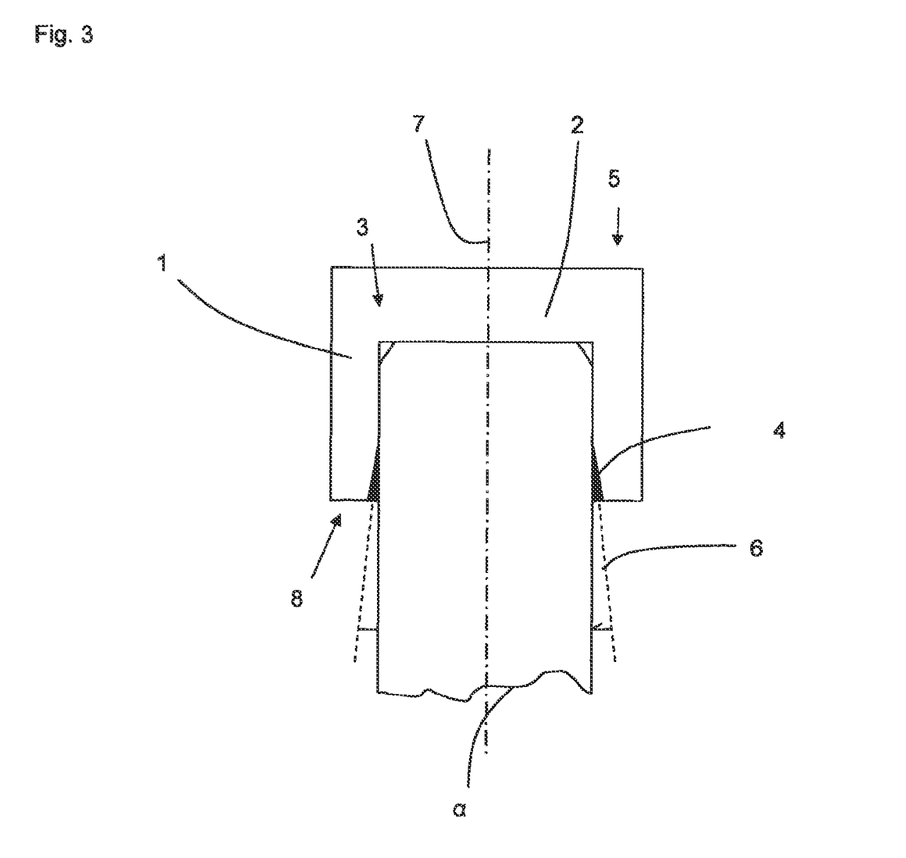

FIG. 3 shows a piston unit with a closed piston 1. In contrast to the previous piston units, the axial bore hole 3 does not penetrate the piston 1 but is designed as a blind bore hole. Here, the piston rod 2 is not completely guided through the piston 1.

The laser ring weld seam 4 is arranged analogously to the one in FIG. 2 on the piston rod side and with a bevelled weld seam center axis 6, which includes the inclination angle α with the main center axis 7. The inclination angle α is also 5 degrees here.

Figure 4:
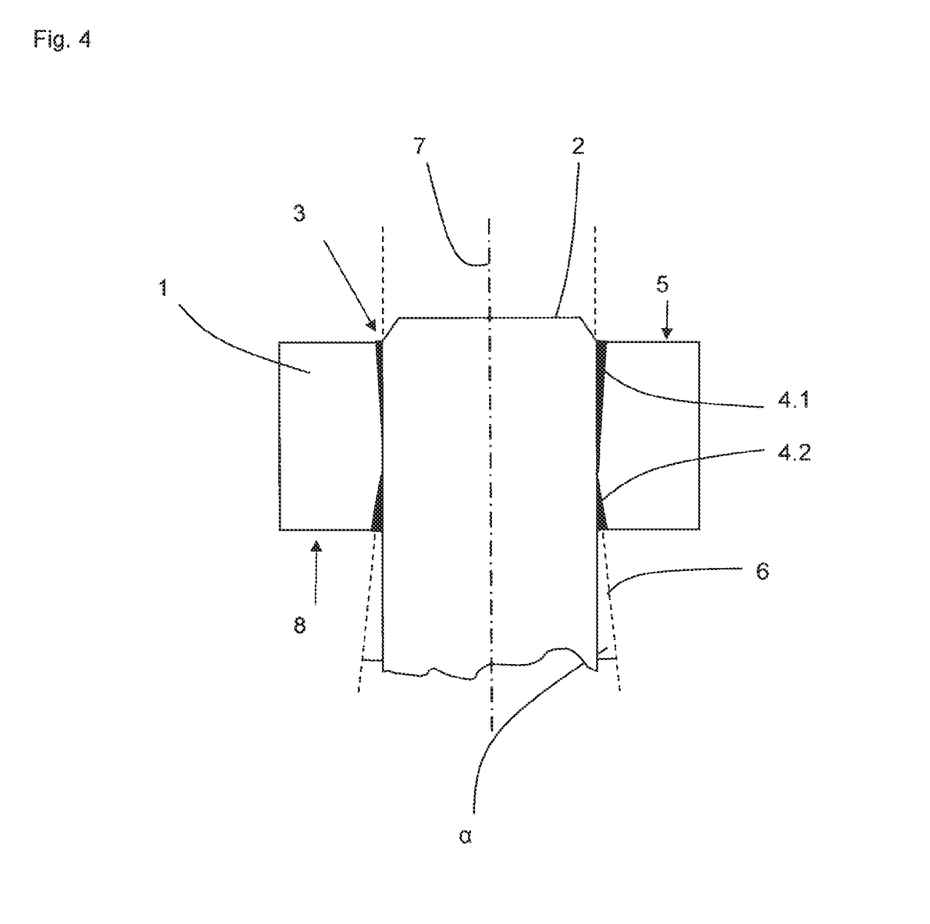

The piston unit shown in FIG. 4 substantially corresponds to the piston units in FIG. 1 and FIG. 2.

In this embodiment, the connection of the piston 1 to the piston rod 2 is established by a first laser ring weld seam 4.1 and a second laser ring weld seam 4.2.

The first laser ring weld seam 4.1 corresponds to the laser ring weld seam 4 of FIG. 1, in which the weld seam center axis 6 runs parallel to the main longitudinal axis 7, and welding is performed from the bottom side 5.

The second laser ring weld seam 4.2 corresponds to the laser ring weld seam 4 of FIGS. 2 and 3, in which the weld seam center axis 6 and the main longitudinal axis 7 include the inclination angle α. Here, the inclination angle α is also 5 degrees. Here, welding is done from the piston rod side 8

In this embodiment, the first laser ring weld seam 4.1 and the second laser ring weld seam 4.2 contact or overlap each other, resulting in a joint over the entire cylindrical contact surface of the piston 1 and piston rod 2. Thus, a maximum load capacity of the connection is obtained.

Figure 5:
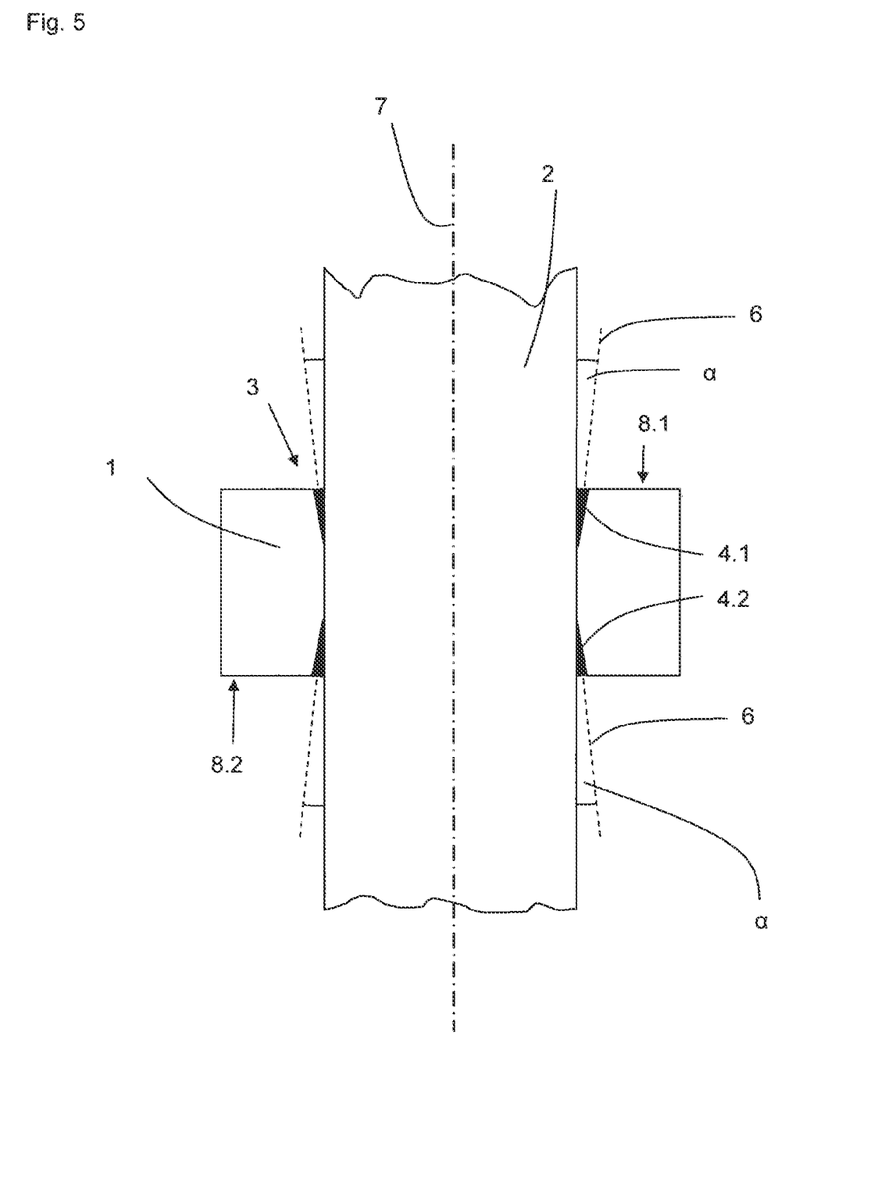

FIG. 5 shows a piston unit of a synchronized cylinder. The special feature of the synchronized cylinder is that it does not have a bottom side 5 due to the passing piston rod 2. For this reason, the two sides are defined as a first piston rod side 8.1 and a second piston rod side 8.2. In this embodiment, both piston rod sides 8.1, 8.2 are of the same design.

In contrast to the other embodiments of the piston units, both the first laser ring weld seam 4.1 and the second laser ring weld seam 4.2 are bevelled by the inclination angle α relative to the main longitudinal axis. Here, the inclination angle α is also 5 degrees.

In this design, the first laser ring weld seam 4.1 is laser-welded from the first piston rod side 8.1 and the second laser ring weld seam 4.2 is laser-welded from the second piston rod side 8.2.

Figure 6:
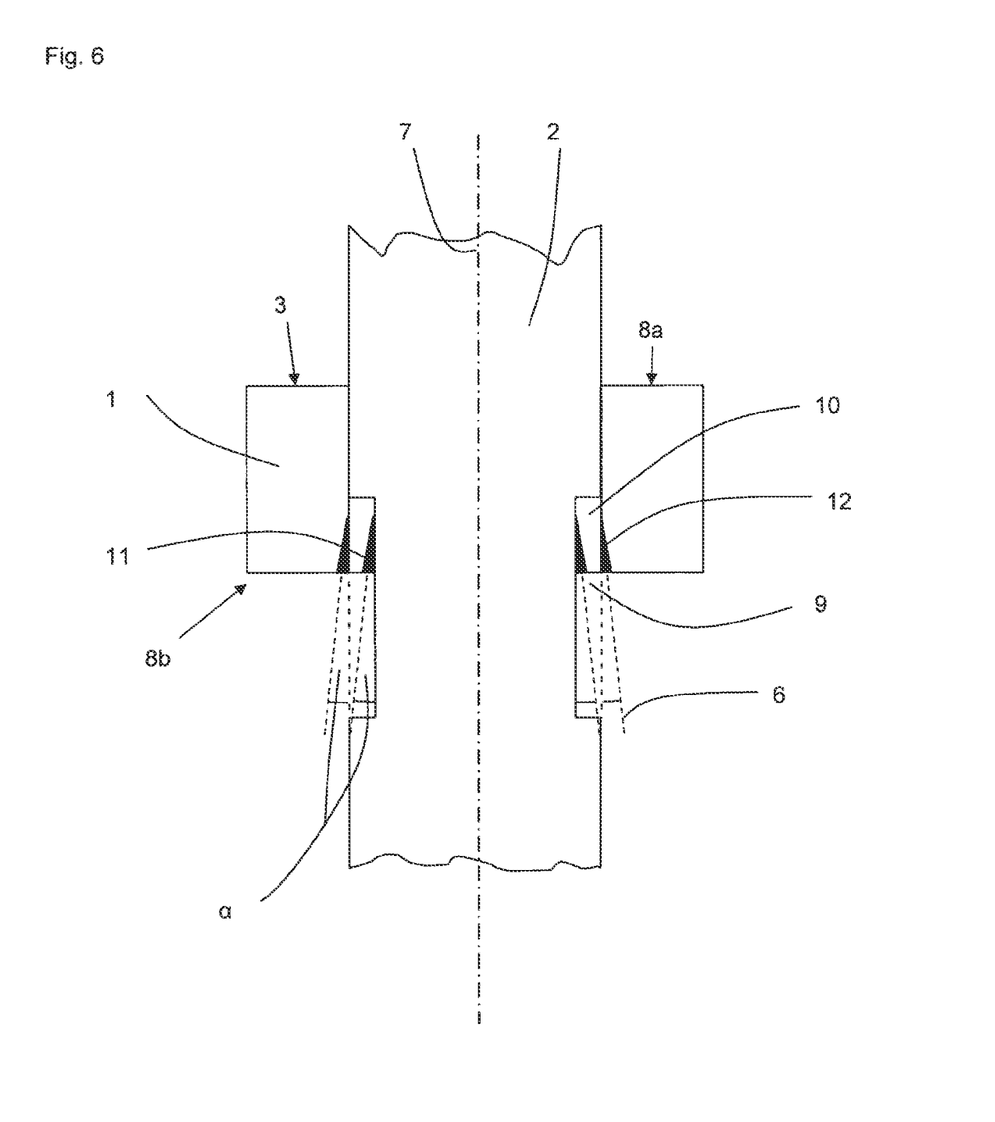

FIG. 6 shows a piston unit with an annular compensation layer 10. In this embodiment, the surface of the piston rod 2 is chromium-plated.

The surface in an annular section 9 is removed by turning to such an extent that a section with a reduced cross-section is formed. For reasons of clarity, the degree of cross-section reduction is shown in an exaggerated view in FIG. 6. The annular compensation layer 10, which is designed as a segmented steel sleeve in this embodiment, is inserted into this cross-sectionally reduced annular section 9. The piston 1 is pushed over the annular compensation layer 10.

The piston rod 2 is welded to the annular compensation layer 10 by means of the radial inner laser weld seam 11. The annular compensation layer 10 is materially homogeneous to the piston rod 2 under the chromium layer and to the piston 1. Here, the weld seam center axis 6 is inclined at the inclination angle α. The inclination angle α is 5 degrees.

The piston 1 is welded to the annular compensation layer 10 by means of the radial outer laser weld seam 12. The weld seam center axes 6 of the radial outer laser weld seam and the radial inner laser weld seam 11 run parallel.

Figure 7:
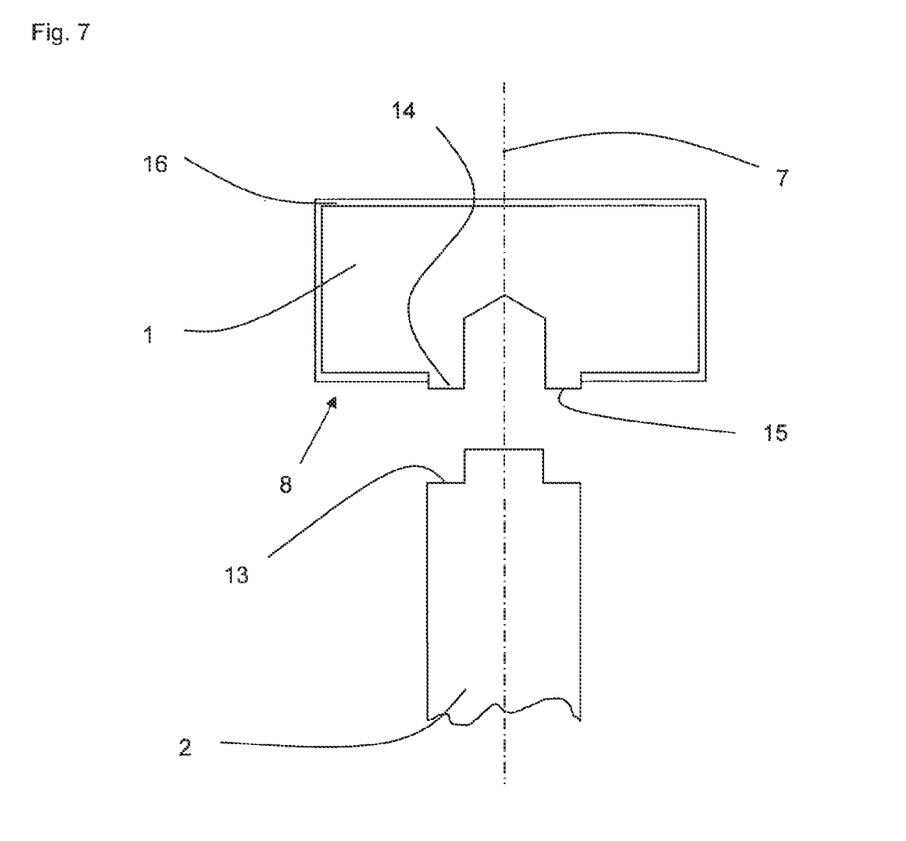

FIG. 7 shows a piston unit with a piston 1 which has a hardened surface 16.

Furthermore, the piston 1 has a flat cylindrical machine-molded section 14, which projects slightly over the rest of the contour of the piston 1 on the piston rod side 8.

The hardened surface is removed from the axial mating contact surface 15 in the area of the flat cylindrical machine-molded section 14 by surface grinding. In the center of the flat cylindrical machine-molded section 15 there is a centring bore hole which corresponds with a centring pin in the center of the axial contact surface 13 of the piston rod 2.

In this way, the piston 1 can be placed on the piston rod 2, and thus both are fixed in their relative radial position.

Figure 8:
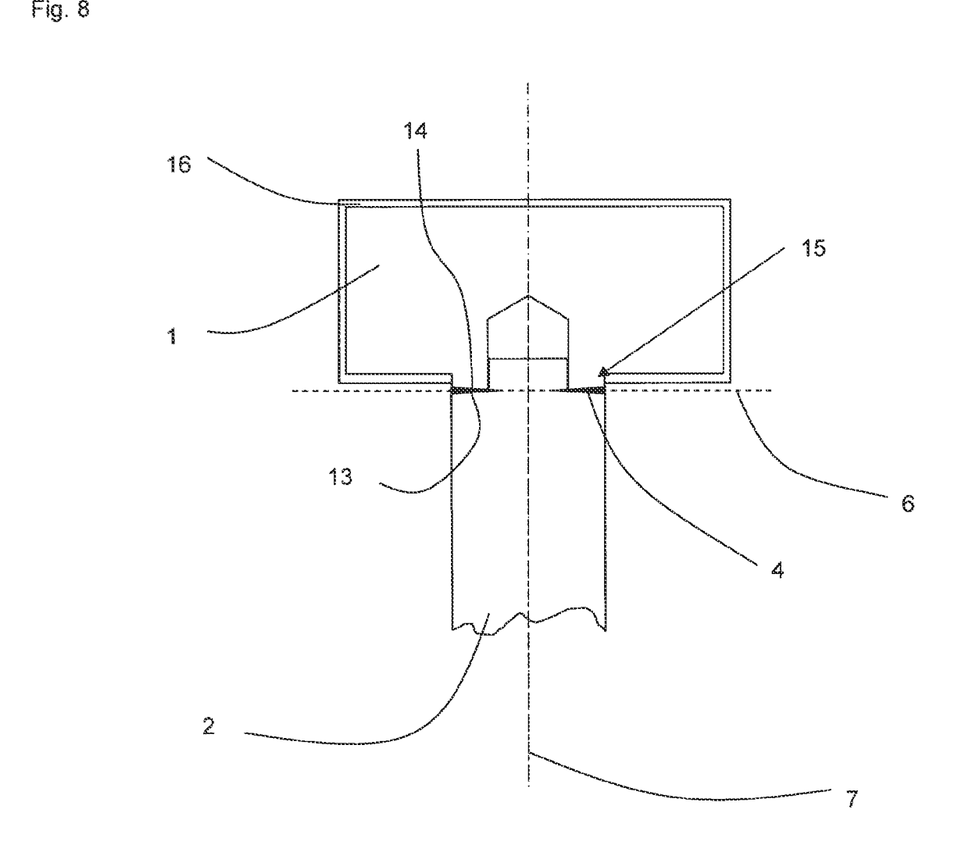

FIG. 8 shows the completely assembled piston unit of FIG. 7. The piston 1 has been placed axially on the piston rod 2 so that the contact surface 13 and the mating contact surface 14 are in contact. The centring pin is in engagement with the centring bore hole.

The piston 1 and the piston rod 2 are connected along the corresponding contact surfaces 13, 14 by means of the laser ring weld seam 4.

Compared to the previously described piston units, the weld seam center axis 6 runs perpendicular to the main longitudinal axis.

LIST OF REFERENCE NUMERALS

1 piston
2 piston rod
3 axial bore hole
4 laser ring weld seam
4.1 first laser ring weld seam
4.2 second laser ring weld seam
5 bottom side
6 weld seam center axis
7 main longitudinal axis
8 piston rode side
8.1 first piston rode side
8.2 second piston rode side
9 cross-sectionally reduced annular section
10 annular compensation layer
11 radial inner laser weld seam
12 radial outer laser weld seam
13 axial contact surface
14 flat cylindrical machine-molded section
15 axial mating contact surface
16 hardened surface
α inclination angle alpha

The invention claimed is:

1. A piston unit of a working cylinder, comprising:
a piston and a piston rod, said piston having an axial bore hole formed therein, said piston rod having a chromium-plated outer lateral surface, said piston rod being received in said axial bore hole, said piston rod and said piston being connected with a material-bond by a circumferential laser ring weld seam, said laser ring weld seam defining a pressure medium-tight sealing plane; and
said outer lateral surface having a non-chromium-plated cross-sectionally reduced annular section, an annular compensation layer arranged between said piston and said cross-sectionally reduced annular section, said laser weld ring seam including a radial inner laser ring weld seam connecting said piston rod to said annular compensation layer and a radial outer laser ring weld seam connecting said annular compensation layer to said piston.

* * * * *